United States Patent [19]

Mueller

[11] Patent Number: 6,029,993
[45] Date of Patent: Feb. 29, 2000

[54] SIDE AIRBAG DEVICE, METHOD FOR OPERATION THEREOF AND VEHICLE SEAT THEREWITH

[75] Inventor: Olaf Mueller, Ruesselsheim, Germany

[73] Assignee: Inova GmbH Technische Entwicklungen, Ruesselsheim, Germany

[21] Appl. No.: 09/165,744

[22] Filed: Oct. 6, 1998

[30] Foreign Application Priority Data

Oct. 6, 1997 [DE] Germany ................. 297 17 795 U

[51] Int. Cl.⁷ .................................. B60R 21/22
[52] U.S. Cl. ...................... 280/730.2; 280/733
[58] Field of Search ............. 280/730.1, 730.2, 280/743.2, 733

[56] References Cited

U.S. PATENT DOCUMENTS

| | | | |
|---|---|---|---|
| 5,462,308 | 10/1995 | Seki et al. ................. | 280/749 |
| 5,464,246 | 11/1995 | Castro et al. .............. | 280/730.2 |
| 5,499,840 | 3/1996 | Nakano .................... | 280/730.1 |
| 5,533,588 | 7/1996 | Maiwald et al. ............ | 180/282 |
| 5,630,616 | 5/1997 | McPherson ................ | 280/730.2 |
| 5,752,713 | 5/1998 | Matsuura et al. ........... | 280/730.2 |
| 5,865,462 | 2/1999 | Robins et al. .............. | 280/730.2 |

Primary Examiner—Lanna Mai
Assistant Examiner—Kevin McKinley
Attorney, Agent, or Firm—Evenson, McKeown, Edwards & Lenahan, PLLC

[57] ABSTRACT

A side air bag system has at least one inflatable air bag, a supporting strap which can be tensioned in the area of the inflated air bag, as well as operating devices for tensioning the supporting strap and inflating the air bag into their protective positions. The supporting strap is coupled with the air bag such that the tensioning supporting strap pushes the air bag out of its folded position into its protective position. An operating process for a side air bag system has at least one inflatable air bag, a supporting strap which can be tensioned in the area of the inflated air bag and operating devices for inflating the air bag and tensioning the supporting strap into their final protective positions, in which case the unfolding of the air bag from a folded condition into an at least essentially unfolded condition is at least supported by the tensioning of the supporting strap.

54 Claims, 4 Drawing Sheets

SIDE AIRBAG DEVICE, METHOD FOR OPERATION THEREOF AND VEHICLE SEAT THEREWITH

BACKGROUND AND SUMMARY OF THE INVENTION

The invention relates to a side air bag system and, more particularly to a side air bag system having at least one inflatable air bag, a supporting strap which can be tensioned in the area of the inflated air bag sa well as operating devices for tensioning the supporting strap and inflating the air bag into its protective position. Furthermore, the invention relates to an operating process for such a side air bag system. In addition, the invention includes a motor vehicle seat equipped with such a side air bag system.

Nowadays, air bag systems are part of the standard equipment of many motor vehicles and offer their occupants a situation-related protection. For this purpose, air bag systems are used not only in front of the occupants for protecting the head which, in the event of a collision, is accelerated toward the front, but air bag systems are also provided laterally of the occupants in order to protect the occupants' head and thorax in the event of a side impact.

German Patent Document DE 44 36 139 C1 describes a passenger seat which has a side impact protection. Such a passenger seat, particularly for motor vehicles, has, at least on one of its sides, a laterally integrated side air bag which, when it is triggered, emerges from the seat contour, can be inflated and, as a result, laterally bridges the space between the seat surface and the backrest. The latter is constructed as a hose which is shortened in its longitudinal course as the result of the enlargement of the diameter connected with the inflating and, in its installed position, is fastened with its one end in the forward area of the seat surface and with its other end in the upper area of the backrest. In this case, it is not ensured that the side air bag can unfold in a perfect manner during the inflating and is not clamped in between an occupant and the vehicle body or the seat.

From German Patent Document DE 195 42 436 A1, an air bag system for a motor vehicle is known which has at least one air bag which can be filled with gas, at least one gas storage device for filling the air bag, and a holding device by means of which the air bag is held along a frame part of the vehicle body in the passenger compartment. A supporting strap is provided on the air bag which forms a lateral support for the filled air bag. The supporting strap, which is folded together with the air bag, after the triggering of the air bag, is tensioned simultaneously with its filling and extends along the outer side of the filled air bag, particularly diagonally thereto or to a vehicle window. Although the supporting strap achieves an additional guidance for the air bag when it is moved out of the covering, it cannot be excluded in this case that the air bag may catch between the supporting strap, the vehicle body parts and occupants' extremities or may be clamped between them.

The two above-described known air bag systems cannot ensure the protective effect of the air bag because the air bag may be hindered during the inflating and can therefore possibly not assume its intended shape and position, whereby the safety effect of such a side air bag, as well as of a thorax air bag or head air bag, is restricted.

It is an object of the invention to provide a side air bag system which offers a greater safety to an occupant. This object is achieved by means of a side air bag system having at least one inflatable air bag, a supporting strap which can be tensioned in the area of the inflated air bag as well as operating devices for tensioning the supporting strap and inflating the air bag into its protective position. The tensioning supporting strap is coupled with the air bag such that the tensioning supporting strap pushes the air bag out of its folded position into its protective position.

Furthermore, the invention has the object of providing an operating process for a side air bag system, by means of which the latter provides an increased protection for the occupant. For achieving this object, the invention provides an operating process for a side air bag system characterized in that the unfolding of the air bag from a folded condition into an at least essentially unfolded condition is at least supported by the tensioning of the supporting strap.

It is also an object of the invention to provide a motor vehicle seat with a side air bag system which increases an occupant's safety. According to the invention, this object is achieved by means of a motor vehicle seat having a seat element and a backrest element as well as a side air bag system which has at least one air bag which can be inflated by means of operating devices and which, in its folded condition, is arranged in an, in particular, angular accommodation space which extends on one side of the motor vehicle seat over the seat element and the backrest element. In the inflated condition, the air bag extends in a protective position between the seat element and the backrest element. In this case, a supporting strap is arranged along the air bag, which supporting strap can be tensioned in the area of the inflated air bag and is coupled with it such that the tensioning supporting strap pushes the air bag into its protective position. The supporting strap together with the folded air bag is arranged in the optionally angular accommodation space. The operating devices during the triggering of the air bag are designed for acting upon the supporting strap in order to tension it into the protective position.

A side air bag system according to the invention therefore contains at least one inflatable air bag, a supporting strap which can be tensioned in the area of the inflated air bag and operating devices for inflating the air bag and tensioning the supporting strap in its protective positions. The supporting strap is coupled with the air bag such that the tensioning supporting strap pushes the air bag out of its folded position into its protective position.

By means of the tensioning of the supporting strap, in addition to its own endeavors caused by the inflating, the air bag is reliably pushed into its protective position. As the result of the supporting strap, the air bag can reach its protective position also through the smallest spaces without being clamped in before contacting an occupant with a vehicle part between the occupant and the vehicle part.

Because of the fact that, according to the invention, the supporting strap extends along the cushion-type or hose-type air bag when it is inflated, the latter is advantageously reinforced, which has the result that it can absorb higher forces. This also has the advantage that the combination of the air bag and the supporting strap, on the one hand, provides a firm hold for occupants, which saves the occupants from impacting the vehicle body, and, on the other hand, forms an effective obstacle for objects penetrating into the interior of the vehicle.

By means of the invention, it is therefore, on the one hand, ensured that the air bag can reliably take up its protective position, in which its inflated gas bag according to its purpose absorbs kinetic energy from occupants and, on the other hand, an effective barrier is created which carries out an additional protective function in that it prevents the occupant from sliding "against" the accident. The tensioning of the supporting strap also advantageously provides the occupant with a correct momentum or thrust toward the interior of the vehicle, thus away from the accident. It is also advantageous that, by means of the supporting strap, a further reinforcement of the vehicle body is achieved against the effects of the accident, the possible deforming of the tensioned supporting strap itself having an energy-consuming effect.

Preferably, the air bag is constructed in the manner of a cushion in order to extend in its protective position between a backrest element and a seat element of a seat. The air bag may also be constructed is the form of a hose, the supporting strap then being arranged along the hose-type air bag and, in the course of its length, being coupled with it such that the tensioning supporting strap pushes the air bag into its protective position.

According to another preferred embodiment of the invention, the air bag has such an at least essentially triangular shape that, in the protective position of the air bag, a first side matches the shape along a backrest element and a second side matches the shape along a seat element of a seat, and the third side extends between the backrest element and the seat element of the seat.

In the case of a side air bag system according to the invention, the tensioned supporting strap and the inflated air bag or one side thereof extend at least approximately in parallel with respect to one another.

According to another preferred further development of the side air bag system according to the invention, the supporting strap has an end area facing the operating devices in which it is coupled with the operating devices and which can be displaced relative to the corresponding end area of the air bag which is stationary with respect to the operating devices, and an end area facing away from the operating devices in which it is stationary relative to the corresponding end area of the air bag. In other words, the supporting strap is fixed on one end and, on the other end assigned to the operating devices, is coupled with the operating devices. This has the advantage that only one end of the supporting strap has to be pulled in order to tension it, and, as a result, only a minimal expenditure is required for the operating devices. For the tensioning of the supporting strap, the operating devices can be constructed analogously to belt tightening devices and air bag systems, so that the respective previous technology, particularly from the present applicant's earlier applications, is part of the disclosure content of these documents. In particular, these are the older German Patent Applications DE 196 41 224.2, DE 197 03 945.6, DE 197 07 998.9, DE 197 09 257.8, DE 197 12 782.7, DE 197 15 463.8, DE 197 26 878.1, DE 197 33 896.8 and DE 197 38 727.6.

It is another advantageous embodiment of the side air bag system according to the invention that the supporting strap is situated in the interior of the air bag or in a guide assigned to its exterior cover. As a result, it is ensured that an occupant cannot strike against the supporting strap itself but the latter is always surrounded by the filled and therefore damping gas bag of the air bag. However, as an alternative, it may also be provided that the supporting strap is connected, at least in areas, with the outer cover of the air bag or is constructed integrally therewith. As a result, particularly when the supporting strap is arranged on the side of the air bag facing away from an occupant, the whole inflated air bag is situated in a damping manner between an occupant and the supporting strap.

When the operating devices are designed for tensioning the supporting strap at least partially before the inflating of the air bag is started, as may be provided in another embodiment of the invention, the advantage is achieved that the air bag is not yet inflated and therefore folded together relatively thinly as long as it is moved into its protective position by the tensioning supporting strap. In this condition, the air bag can be pulled without any problem even through very small spaces. If the air bag is inflated during this operation, it presses the occupant virtually back onto his seat, which can be achieved by the fact that the operating devices are designed for inflating the air bag during the tensioning of the supporting strap and in particular starting simultaneously therewith.

For this purpose, it is particularly provided according to the invention that a bracing piston is provided for operating the tensionable supporting strap in, for example, a propelling charge container with two different pressure levels. In general terms, this embodiment of the invention relates to the fact that the operating or tensioning of the tensionable supporting strap is carried out by means of a first pressure level, and the inflating of the air bag takes place by means of a second pressure level. For example, a high-pressure level of approximately 300 bar in a high-pressure chamber can be used for tensioning the supporting strap and a lower pressure level of approximately 100 bar in a low-pressure chamber can be used for inflating the air bag, which both can be triggered by means of a single electric ignition. Pressure chambers are provided corresponding to the two different pressure levels, which pressure chambers can be blocked with respect to one another by at least one valve and preferably different valves. In this case, the operation according to the invention is, for example, as follows: During the bracing of, for example, a thorax bag, for the effective movement of the piston, for example, approximately 300 bar are required, for example, from a pyrotechnical propelling charge container. In contrast, for the inflating of the bag, no more than, for example, 100 bar may be used so that no more than 1 bar will occur in the bag.

Within the scope of the invention, the above-explained embodiment can be achieved, for example, by a conventional particularly electric propelling charge container whose ignition ignites advantageously through corresponding holes from the high-pressure chamber through to the low-pressure chamber and there ignites a, for example, pyrotechnical gas generator. In the case of such an embodiment, such ignition holes must then be closed immediately so that the filling gas for the air bag generated by means of the gas generator is supplied only to the air bag and is not lost for its filling in that it escapes into the cylinder for guiding the piston for tensioning the supporting or tensioning rope.

The operating devices of a side air bag system according to the invention preferably contain a tensioning device for the supporting strap and a filling device for the air bag, thus two separate energy accumulators, the tensioning device and the filling device preferably being coupled and particularly preferably mutually interacting. Within the scope of the invention, this is preferably further developed in that the filling device contains a gas generator and/or a gas storage device. As an alternative or in addition, the tensioning device may contain an energy accumulator and driving devices which can be acted upon by it, for the tensioning of the supporting strap, and the driving devices may particularly contain a preferably releasable return stop and particularly preferably a return stop which, with respect to the triggering of the operating devices, automatically releases in a time-delayed manner. The latter prevents that a tension of the supporting strap which has once been achieved loosens because of a high counterforce, and then that the air bag with the supporting strap locks an occupant in a vehicle involved in an accident.

By means of one of the preferred combinations according to which the gas generator and/or the gas storage device of the filling device is at least one portion of the energy accumulator of the tensioning device, or the energy accumulator of the tensioning device is at least one portion of the gas generator and/or of the gas storage device of the filling device, a particularly economical and simple construction of the operating devices is achieved.

It may also preferably be provided that the air bag is connected in a gas-tight manner with the gas generator and/or the gas storage device, and the supporting strap is permanently coupled to the driving devices or, in particular, can be automatically coupled by their triggering. Particularly the latter permits, in the case of a seat which can be adjusted, for example, in its height, inclination, and/or in the longitudinal direction of the vehicle, the mounting of the operating devices outside the adjustable seat parts, for example, below the seat. In a further development of the invention of the latter, the driving devices may contain a piston which can be acted upon by the energy accumulator, to which piston the supporting strap is coupled or, in particular, can be automatically coupled by the triggering of the driving devices.

Further embodiments of a side air bag system according to the invention may comprise that a pyrotechnical activation and particularly an ignition of the gas generator/gas storage device of the filling device and/or of the energy accumulator of the tensioning devices is provided, and/or at least one of these components is designed in a multi-stage manner.

It is also preferred that the gas generator and/or the gas storage device of the filling device and/or the energy accumulator of the tensioning device or optionally at least a first stage of the gas generator and/or of the gas storage device of the filling device and/or of the energy accumulator of the tensioning device or optionally their pyrotechnical activation or ignition in the case of a side air bag system according to the invention, can be electrically triggered and, in particular, ignited. This can be further developed in that at least a second stage of the gas generator and/or of the gas storage device of the filling device and/or of the energy accumulator of the tensioning device or optionally their pyrotechnical activation or ignition can be mechanically triggered and, in particular, ignited.

For increasing the reliability at least of the mechanical parts of the electric and/or mechanical triggering and particularly of the ignition, these modules may be provided twice and can be acted upon simultaneously but independently of one another.

When, on its end assigned to the operating devices, the supporting strap is formed by a material which is resistant to the operating temperatures in the operating devices, advantageously particularly effective operating devices can be used, in which, however, temperatures occur which the remaining supporting strap would not withstand.

Preferably, the supporting strap has, at least in the area of the inflated air bag, that is, when it is in its protective position, a width which is significantly larger than its thickness, and the width of the supporting strap is, in particular, in the range of approximately 10% to approximately 90%, preferably of approximately 20% to approximately 60%, and particularly preferably of approximately 25% to approximately 40% of the diameter of the air bag.

If, as according to another preferred further development of the invention, in the case of a side air bag arrangement, two air bags are coupled with pertaining supporting straps for a use on both sides of an occupant, and particularly can be operated by way of common operating devices, in the event of an accident, an occupant is protected on both sides and, in addition, is securely held on his seat. The common operating devices of both air bags with pertaining supporting straps permit a low-cost as well as space-saving and weight-saving design.

Although reference was made above at points to the combination of the side air bag system according to the invention with a motor vehicle, this is not absolutely necessary. Within the scope of the invention, the air bag together with the supporting strap of the side air bag system may also be appropriately accommodated in body parts of the vehicle, for example, in the area of the A-column and the adjoining roof strut pointing toward the rear with respect to the normal driving direction; the B-column and the possibly adjoining roof strut pointing toward the rear; the B-column and preceding roof struts pointing toward the front, possibly the C-column and preceding roof struts pointing toward the front, the dashboard holding device and lateral vehicle body parts, etc., and may be inflated and tensioned. If in this case, as in the case of the accommodation in a motor vehicle seat which will be discussed in greater detail in the following, the air bag and the supporting strap, before their triggering, are arranged in an angular accommodation space and are designed such that, in their protective position, they span the angle formed by the angular accommodation space, a protective position of the air bag and the supporting strap can be optimally defined ahead of time according to the vehicle model, shape and size.

The operating process also created by the present invention relates to a side air bag system with at least one inflatable air bag, a supporting strap which can be tensioned in the area of the inflated air bag and operating devices for inflating the air bag and tensioning the supporting strap into their final protective positions. According to the process, it is provided in this case, while achieving the objects indicated above and with the advantages indicated with respect to the system variants, that the unfolding of the air bag from a folded condition into an at least essentially unfolded condition is at least supported by the tensioning of the supporting strap. The unfolding may at least partially be a stretching operation.

Analogously to the system variants, it can further be implemented as provided in the case of the operating process according to the invention that the stretching of the supporting strap is first started before the inflating of the air bag begins. As an alternative, which also has advantages, the stretching of the supporting strap and the inflating of the air bag can also be started at least essentially simultaneously after the triggering of the side air bag system.

Preferably a further development of the operating process according to the invention provides that, by means of the triggering of the side air bag system, a filling gas for the air bag is generated or released and driving devices are acted upon to which the supporting strap is connected.

Within the scope of the invention, a motor vehicle seat is also provided which contains a seat element and a backrest element as well as a side air bag system which has at least one particularly cushion-type or hose-type air bag which can be inflated by means of operating devices and which, in its folded condition, is arranged in an angular accommodation space which extends on one side of the motor vehicle seat over the seat element and the backrest element and which, in the inflated condition, extends in a protective position partially diagonally between the seat element and the backrest element. In this case, it is provided that a supporting strap is arranged along the air bag, which supporting strap can be tensioned in the area of the inflated air bag and, in the course of its length, is coupled with it such that the tensioning supporting strap pushes the air bag into its protective position, that the supporting strap together with the folded air bag is arranged in the angular accommodation space, and that the operating devices during the triggering of the air bag are designed for acting upon the supporting strap in order to tension it into the protective position.

In the case of a motor vehicle seat according to the invention, before their triggering, the air bag and the supporting strap can be situated behind a panelling or tear seams in the accommodation space.

A preferred further development of the motor vehicle according to the invention consists of the fact that the operating devices are arranged below the seat element in the driving direction or particularly transversely thereto, and, in particular, are reinforcingly connected with the seat structure and/or the vehicle structure. Particularly the arrangement of the operating devices below the seat element transversely to the driving direction is a preferred variant which can also be awarded a separate inventive significance, optionally in the case of a seat or a frame structure of the motor vehicle with operating devices of a side air bag system or a use of a transverse spar of a frame structure of the motor vehicle for receiving the operating devices of a side air bag system. Specifically in the area of the seat, this construction achieves a reinforcement with respect to a side impact, which by the use of this technology in addition to the conventional existing structure increases the safety or can be used for structural savings in the case of the normally existing structure while maintaining the safety standard.

The advantages of another embodiment of the motor vehicle seat according to the invention were explained above, in which one air bag respectively with its assigned supporting strap is provided on both sides of the seat, and in which preferably both air bag and supporting straps can be acted upon by common operating devices.

Height, inclination and/or longitudinal adjusting possibilities in the case of a seat can be combined with operating devices arranged outside the adjustable seat components without any reduction of comfort and functions, if the supporting strap and/or the air bag is coupled by way of compensating devices to the operating devices or can be coupled when the side air bag system is triggered, which was also discussed in conjunction with the side air bag system according to the invention.

A person skilled in the art can easily find additional objects, characteristics and advantages in the present documents, including combinations with characteristics from the applicant's above-indicated earlier patent applications. In particular, advantageous and preferred further developments of the invention and their above-described embodiments are found in the respective dependent claims and their combinations.

In the following, the invention will be described with reference to the drawing by means of concrete embodiments.

DETAILED DESCRIPTION OF THE DRAWINGS

Figure 1:
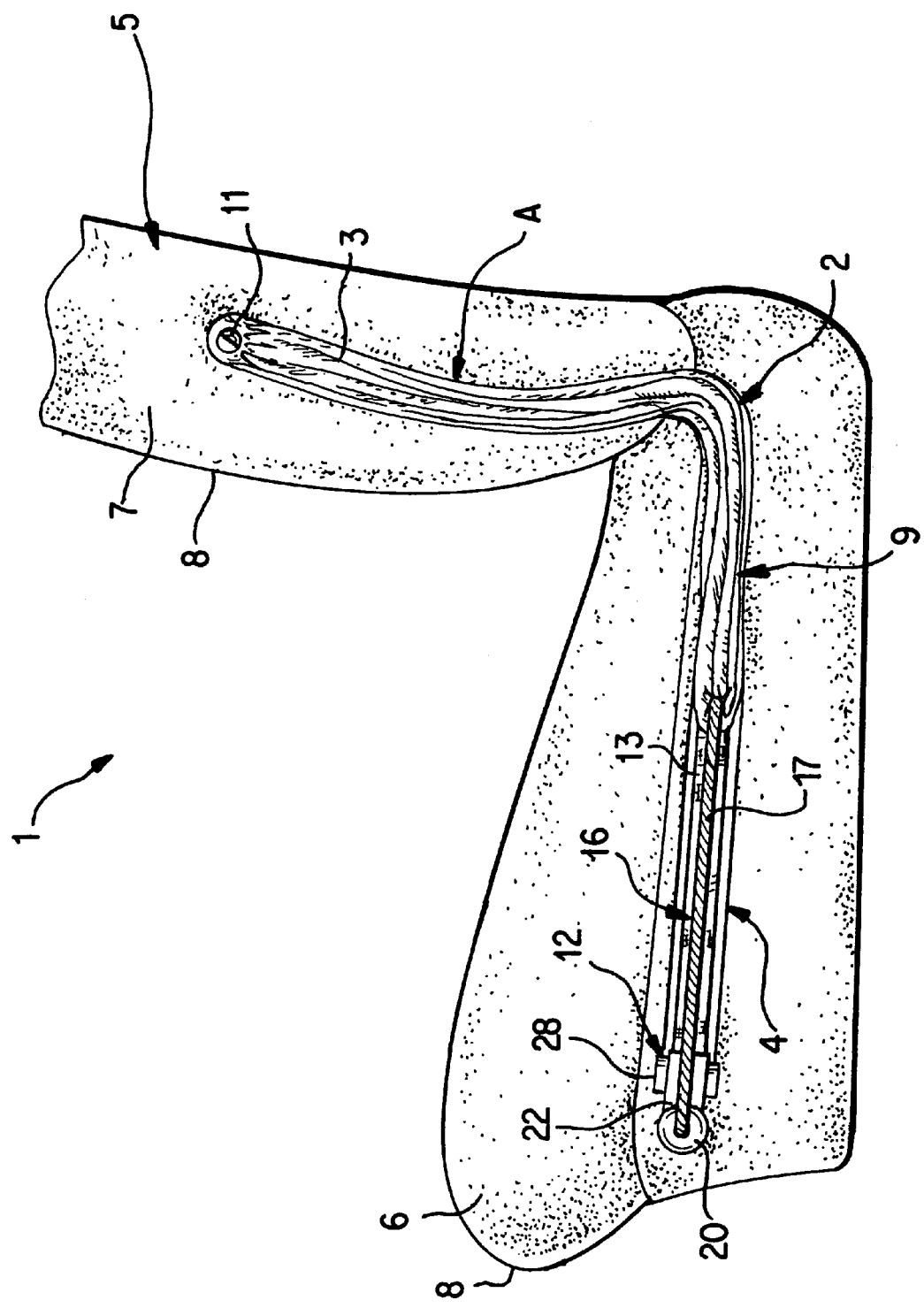
FIG. 1 is a schematic lateral view of a construction of a motor vehicle seat with a side air bag system, the folded air bag and the supporting strap being situated in an accommodation space, whose covering was removed.

In the drawing, the same parts or similar parts or parts acting in the same or similar manner are provided with the same reference numbers in all figures. Therefore these parts or combinations and their functions are clear to the person skilled in the art even in representations for which not all such parts or combinations or their functions are described in detail. In various embodiments, different reference numbers are also used for the same parts or similarly acting parts or combinations, without indicating different functions of these parts or combinations, as easily recognized by the person skilled in the art. In addition, the person skilled in the art can find additional details in the individual illustrations and representations of the drawing and particularly also by a comparison of different figures, although these were not indicated and/or described separately.

The following description of the drawing is also based on general parts and various details of air bags, tensioning devices and motor vehicle seats, as they are illustrated and described in the German patent applications indicated in the introductory part and are therefore fully included in the disclosure content of the present documents.

Figure 2:
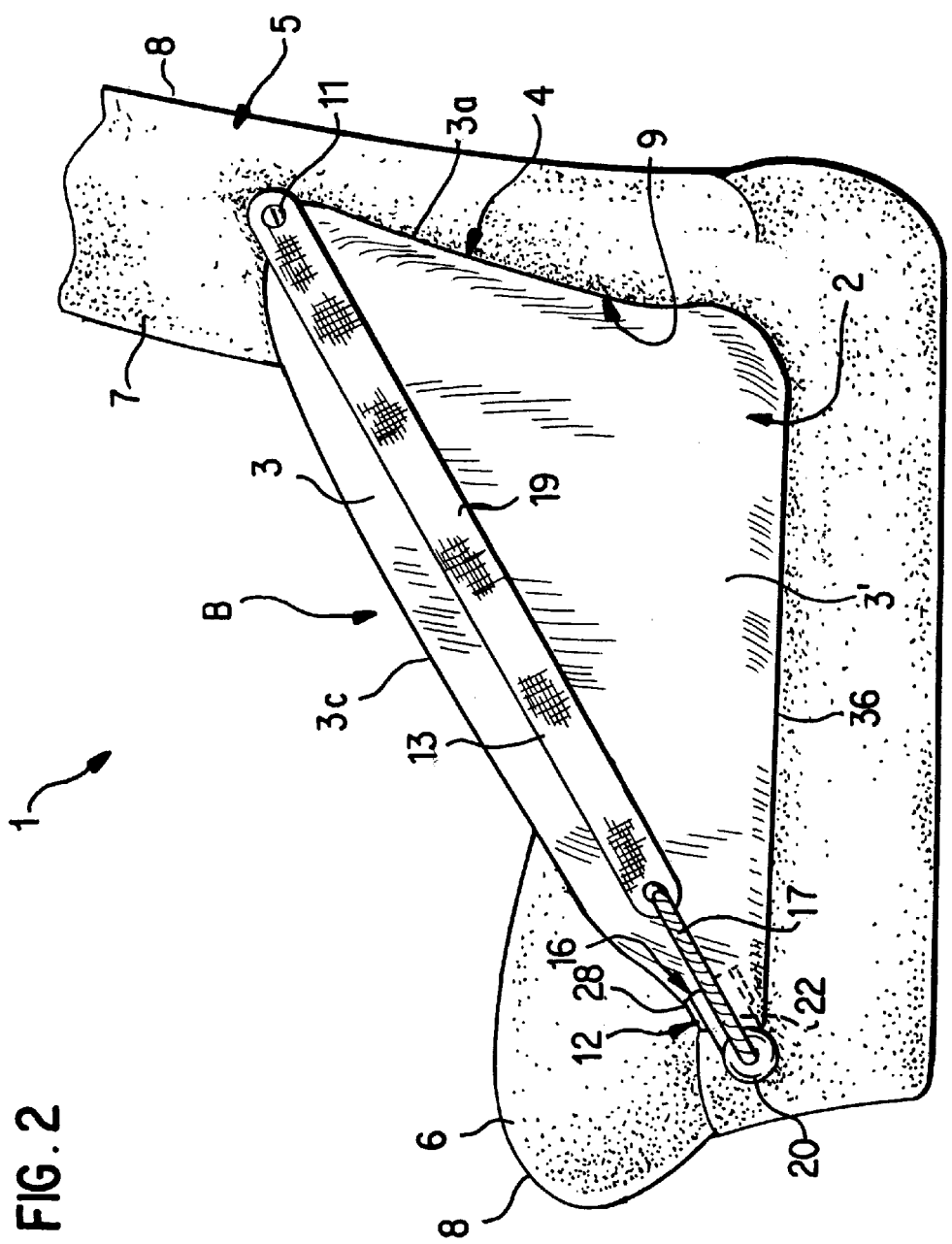
FIG. 2 is a schematic lateral view of the construction of the motor vehicle seat with a side air bag arrangement of FIG. 1, in which case, after its triggering, the inflated air bag and the tensioned supporting strap have emerged from the accommodation space and are in their protective positions.

FIGS. 1 and 2 are each lateral views of a motor vehicle seat 1 which is provided with a side air bag system, generally having the reference number 2. The side air bag system 2 contains an air bag 3 which, in FIG. 1, is in its folded position A inside an accommodation space 4 in a side area 5 of the motor vehicle seat 1, and in FIG. 2 is illustrated in its protective position B, in which its cushion-type design and triangular shape 3' can easily be recognized. The motor vehicle seat 1 generally contains a seat element 6 and a backrest element 7, in which case the sides of the triangular shape 3' of the cushion-type air bag 3 extend as follows in its protective position B: The side 3a extends along the backrest element 7; the side 3b extends along the seat element 6; and the side 3c extends from the backrest element 7 diagonally downward to the seat element 6.

The accommodation space 4 is arranged such that it extends in the seat element 6 as well as in the backrest element 7 and has an angular shape corresponding to the angle enclosed between the latter (see FIG. 1). Normally, that is, when the side air bag system 2 is not triggered, the accommodation space 4, which is open on the side 5 of the motor vehicle seat 1, is covered by means of a covering (not shown). Instead of the covering, it may also be provided that, when the side air bag system 2 is not triggered, the accommodation space 4 is hidden under the seat covering 8 of the motor vehicle seat 1 which exists anyhow and has, for example, tear seams or desired tear lines corresponding to the opening 9 of the accommodation space 4 on the side of the motor vehicle seat 1.

Such a motor vehicle seat 1 is used in a vehicle which, for example, has crash sensors, by which a collision of the vehicle is detected, which leads to the triggering of the side air bag system 2 optionally by way of corresponding controls. In the process, gas is supplied to the air bag 3, which is still folded inside the accommodation space 4, from a filling device 10 (see, for example, FIG. 3 and the description below), until the air bag 3 is tautly inflated and takes up its protective position B (FIG. 2). In this protective position B, the air bag 3 is to protect an occupant (not shown) from a hard lateral contact either with the vehicle body deforming inward as the result of a side impact or a larger object penetrating laterally into the vehicle.

The side air bag system 2 may have seat occupation detection determining the triggering of the air bag (which will not be described here in detail because it is not part of the core of the present invention). It may also be provided that a defined time after the start of the inflating, the air bag releases the contained gas again and relaxes in order to permit an unimpaired access to the corresponding occupant from the side of the vehicle, for example, for rescue measures or to permit an easy leaving of the vehicle for the occupant or his removal therefrom after the accident. Controls suitable for this purpose also do not concern the essence of the invention and are therefore not discussed in detail.

The version illustrated in FIGS. 1 and 2 is a so-called thorax air bag which with respect to its size, shape and position is designed for protecting an occupant's thorax from a hard impact. Corresponding to this endeavored effect, the air bag 3 extends in its protective position B (FIG. 2) approximately from the shoulder or chest area to the thigh or knee area of an occupant sitting in the motor vehicle seat 1, as a function of his body size. For this purpose, the air bag 3 is, on the one side, fastened to the backrest element 7, for example, by means of a screw 11 or another backrest fastening device and, on the other side, has another connection 12 with the seat element 6 which connection may be fixed or displaceable, as will be explained later in detail.

It should be noted that optionally also the position of the fastening of the air bag 3 to the backrest element 7 may be adjustable particularly corresponding to the occupant's body size, as, for example, analogously to the height adjustment of a seat belt or may even be coupled therewith. In addition, the air bag may also take up a protective position (not shown), for example, between a headrest (not shown) and the backrest element 7, in order to correspondingly protect an occupant's head. In addition, without limitations, air bags may also be provided on both sides of the motor vehicle seat 1 for protecting an occupant's thorax and/or head. Furthermore, the invention, to the extent that it relates to the side air bag system 2, is not limited to the accommodation of the air bag/air bags in the motor vehicle seat 1. Basically, a side air bag of a side air bag system 2 according to the invention may also be accommodated on the vehicle body side, as, for example, for occupants sitting in the front, in the area of an A-column and of a roof section which adjoins it relative to the normal driving direction toward the rear, or between this roof section and the B-column situated behind it in the driving direction.

It is important for the side air bag system 2 according to the invention that it contains a supporting strap 13 which extends along the air bag 3 and which is tensioned by the triggering of the side air bag system 2 and is coupled with the air bag 3 such that the tensioning supporting strap 13 pulls the air bag 3 into its protective position B or generally pushes it. In the embodiment of the side air bag system 2 illustrated in FIGS. 1 and 2, the supporting strap 13 which, because of its function can also be called a tensioning strap, extends along the whole length of the air bag 3 inside the latter. As mentioned above, the tensioning strap 13 is fixed together with the air bag 3 on the backrest element 7. At the connection 12 of the air bag 3 with the seat element 6, the supporting strap 13 is guided out of the air bag 3 to a tensioning device 14 (see, for example, FIG. 3 and description thereof below). The tensioning device 14 of the supporting strap 13 and the filling device 10 of the (see, for example, Fig, 3) air bag 3 are components of operating devices 15 (see, for example, FIG. 3).

In its end area 16, which faces the connection 12 of the air bag 3 with the seat element 6, the supporting strap 13 consists of a steel rope 17, because the operating devices contain pyrotechnical energy accumulators 18 (see FIG. 3 and description thereof below), whose triggering results in correspondingly high temperatures which the supporting strap 13 must withstand. It is therefore generally only important that the supporting strap 13, to the extent that it is within the sphere of influence of the operating devices 15 (see, for example, FIG. 3), according to the material, is constructed corresponding to the physical conditions which result from the triggering of the energy accumulators 18. For example, all sufficiently extension-resistant materials are suitable which are resistant to high gas temperatures which may occur in the operating devices 15. At least in the area of the supporting strap 13, in which the latter may come in contact with the occupant, such a rope-type development of the supporting strap 13 would represent an injury potential so that, in the embodiment of FIGS. 1 and 2, the supporting strap 13, to the extent that it is situated within the air bag 3, consists of a woven fabric strap 19. Preferably the width of the woven fabric strap 19 is in the range of approximately 10% to approximately 90%, particularly of approximately 20% to approximately 60% and particularly preferably of approximately 25% to approximately 40%, that is, at approximately one third to one fourth of the diameter of the air bag 3.

The operating devices 15 (see, for example, FIG. 3 and the description below) are housed in a tube or cylinder 20, which is arranged, for example, transversely to the driving direction under the motor vehicle seat 1, for example, connected with its structure (not shown) or a vehicle structure (not shown). However, since, at least with respect to its tendency, the supporting strap 13 in the protective position extends in the vehicle driving direction, a deflection 22 is required as a guide for the supporting strap 13 and the filling gas of the air bag 3, in order to guide the supporting strap 13 and the filling gas out of the cylinder 20 of the operating devices 15 into the air bag 3. So that the different course of the supporting strap 13 close to the operating devices 15, on the one hand, can be adjusted within the accommodation space 4 corresponding to the folded position A of the air bag at least essentially horizontally and, on the other hand, can be adjusted in the protective position B at an angle thereto without any problem, at its outlet (not visible), the deflection 22 for the supporting rope 13 can be swivelled about the axis of the cylinder 20, which is easily recognizable by comparing FIGS. 1 and 2.

As an alternative to the housing of the cylinder 20 transversely to the driving direction, which has the advantage that it offers an additional reinforcement against a side impact, the cylinder may, for example, also extend in the driving direction and may particularly be housed in a top rail (not shown) of the motor vehicle seat 1 or at least a portion of this top rail, whereby a reinforcement is then achieved in the longitudinal direction of the vehicle. With respect to the latter embodiments, reference is made particularly to the German Patent Application DE 197 38 727.6 with the title "Motor Vehicle Seat, Process for its Manufacturing, Use of a Top Rail of a Motor Vehicle Seat and Operating Process of at Least One Safety Function of a Motor Vehicle Seat", which represents an additional application to the German Patent Application DE 197 07 998.9. Correspondingly, the contents of the German Patent Application DE 197 07 998.9 and the above-mentioned additional application are fully included in the present disclosure content.

As indicated in the previous description of the embodiment illustrated in FIGS. 1 and 2, the supporting strap 13 consisting of the steel rope 17 and the woven fabric strap 19, together with the air bag 3, are housed in its folded or storage position A, inside the accommodation space 4 in the lateral area 5 of the motor vehicle seat 1, for example, under coverings (not shown) or behind tear seams (not shown) of the seat cover 8. In the event of a side impact or side crash, in a conventional manner, for example, a propelling charge container contained in the operating devices 15, as an energy accumulator 18 (see, for example FIG. 3 and the description below), is electrically ignited and inflates the air bag 3 which, as the result of the gas filling, presses away coverings existing above the accommodation space 4 or causes tear seams of the seat cover 8 to burst open and is then tensioned between the backrest element 7 and the seat element 6.

The tensioning strap 13 guided through the tube-type or hose-type air bag 3, by way of its steel rope 17, is connected, for example, analogously to the technique used in the case of belt tighteners, with a piston 24, which is a part of driving devices (see, for example, FIG. 3 and the description below), which are contained in the operating devices 15.

The gas which is released from the, or by, the energy accumulator 18 and which is used for filling the air bag 3, in the case of the present embodiment, is used simultaneously for the action upon the piston 24 (see, for example, FIG. 3) within the cylinder 20 in the direction of a tensioning of the supporting strap 13. As the result, the latter is pulled into the cylinder 20 which is mounted longitudinally or preferably transversely to the driving direction in, on or under the seat 1, until it is tensioned between the screw 11 or generally the backrest connection for the joint fastening of the air bag 3 and the supporting strap 13 on the backrest element 7 and of the connection 12 of the air bag 3 on the seat element 6. In the corresponding position, the piston 24 is blocked or locked, for example, by means of a ball clamping brake 26 against a backward movement or otherwise. If a counterload occurs during the tensioning of the supporting rope 13, the blocking or locking takes place in the position of the piston 24 which has been reached so far.

At the inlet side of the supporting rope 13 into the cylinder 20, the air bag 3 is gas-tightly connected with the latter, for example, by means of a hose clip 28.

By means of this motor vehicle seat 1, several advantages are achieved with respect to previously known seats, in the case of which the air bags of the air bag systems act only as cushions, as, for example, in the case of the seat according to German Patent Document DE 44 36 139 C1. Since, in the case of the known seat, the "blow-in space" is quite narrow, the shock absorption effect of the air bag is low. In addition, an occupant cannot be held by the air bag in the conventional motor vehicle seat if, for example, a lateral shock takes place onto the seat; that is, that, despite the shock, the occupant remains in his position and the seat is knocked away from under him by the shock.

In contrast, in the case of the motor vehicle seat 1 according to the invention, advantageously, as indicated above, by means of the tensioning or pulling-up of the supporting strap 13, while the air bag 3 is still at least partially folded, that is, not yet completely inflated, the latter can be guided through the smallest spaces and can be brought into its protective or operating position B, even if the "blow-in space" is very narrow. As a further advantage, it is achieved that, in the inflated condition, thus in its protective position B, by means of the reinforcement which is achieved by the tensioned supporting strap 13, the air bag 3 holds the occupant in the seat 1 and does not let him slide "against" the accident. If the motor vehicle seat 1 according to the invention experiences a lateral shock, it takes along the occupant and, as a result, moves him away from the accident. Furthermore, by means of the tensioning of the supporting strap 13, a bracing of the backrest element 7 is achieved, whereby the occupant receives a momentum in the sense of a movement of his head toward the interior, whereby the occupant will then also face away from the accident. The latter advantageously counteracts a worn conventional three-point seat belt, which, because of the guiding of the belt over the outer shoulder, causes a momentum of the occupant's head toward the outside to the accident. This negative effect is counteracted by the tensioning of the supporting strap 13 and by the supporting strap 13 itself.

However, when a motor vehicle seat 1 is equipped correspondingly, the invention not only achieves an improvement with respect to conventional seats, but in the case of the present motor vehicle seat 1, the tensioned supporting strap 13 also causes a stabilizing of the backrest element 7 in the event of a rear collision. On the other hand, this increased stability of the seat by the supporting strap 13 could also be utilized for savings with respect to the framework of the seat.

If, as suggested above, a motor vehicle seat 1 is equipped on both sides, on the left and on the right, with an air bag supporting strap combination according to the invention, which can, for example, advantageously be operated by a double-piston operating device, this results in an optimal holding of the occupant in the seat during any lateral impact, irrespective of its direction. In addition, the seat backrest is braced and stabilized by the tensioned supporting straps 13 on both sides so that, also in the event of a rear impact, maximal safety is ensured.

Figure 3:
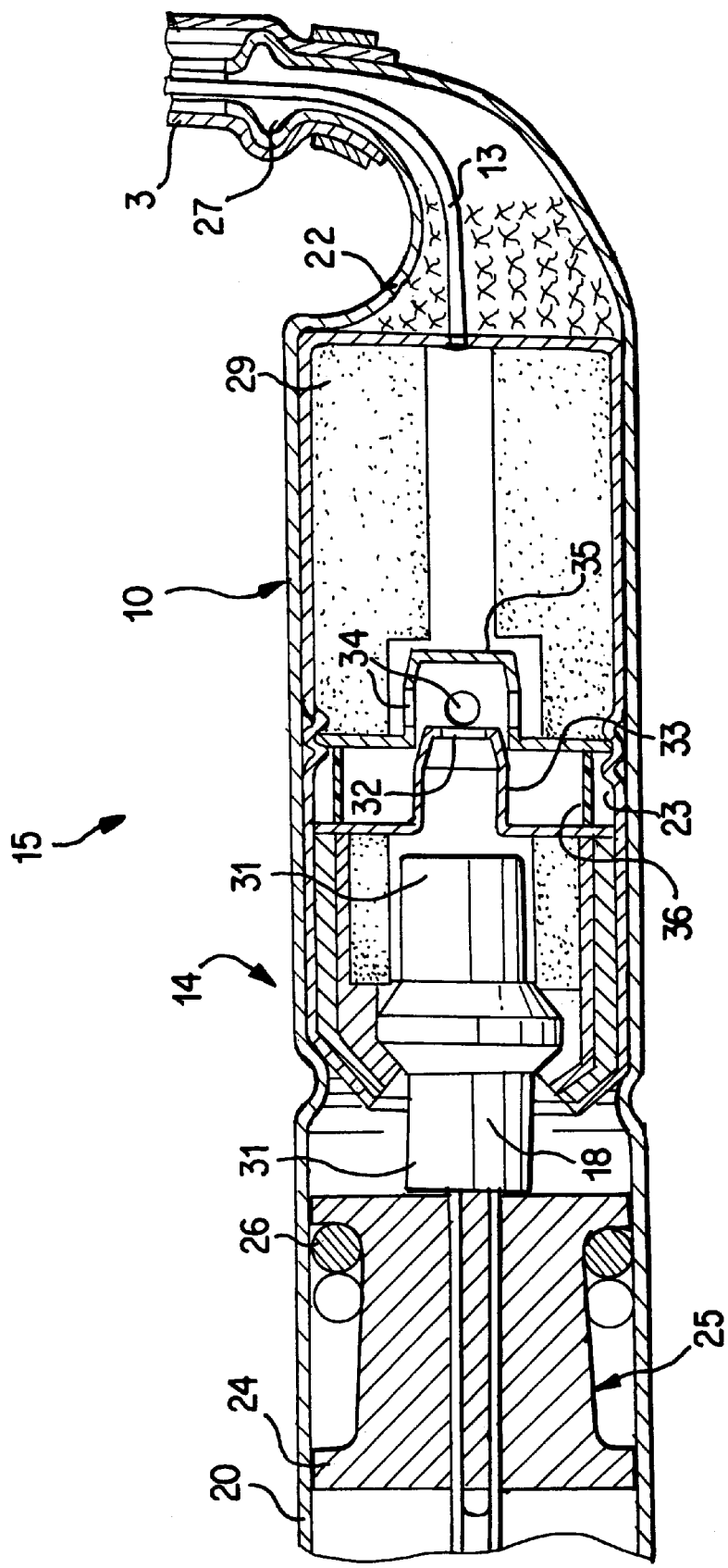
FIG. 3 is a longitudinal sectional view of an important part of an embodiment of operating devices of the side air bag system.

With reference to FIGS. 3 as well as 4A, 4B and 4C, embodiments of the operating devices 15 will now be explained in detail, whereby further characteristics are easily provided to the person skilled in the art by all representations themselves as well as by comparative considerations thereof and by the content of the corresponding following explanations, even if every single figure does not show and/or indicate all characteristics and/or not all characteristics are indicated in this description.

FIG. 3 is a partial longitudinal sectional representation of a cylinder 20 of the operating devices 15 with the opening 27 for guiding through the supporting strap 13 and for connecting the air bag 3. A propelling charge container 23 is inserted in the cylinder 20 and contains a gas generator 29 or gas storage device as the filling device 10 for the air bag 3 as well as an energy accumulator 18 for the driving devices 25 with the piston 24. The energy accumulator 18 and the driving devices 25 represent a tensioning device 14 for the supporting rope 13.

An electrically ignitable cartridge 31 is disposed in the propelling charge container 23 whose ignition can release gas contained, for example, in the energy accumulator 18 under pressure which, gas, by means of its pressure, drives the piston 24 for tensioning the supporting rope 13 if the energy accumulator 18 is further developed as a gas storage device. If, in contrast, as in the example, illustrated in FIG. 3, the energy accumulator 18 is a gas generator 29, as the result of the ignition of the cartridge 31, material contained in the energy accumulator 18 is burnt for generating gas or is exploded.

The effect of the ball clamping brake 26 illustrated in FIG. 3 for the piston 24 was explained above so that it does not have to be discussed here or later. Since, in the case of the operating devices 15, generally techniques can be used as they are used, for example, in the case of belt tighteners or frontal air bags or other correspondingly operated safety devices in a motor vehicle, reference is made in this respect to the older patent applications mentioned here, particularly to those of the present applicant.

By means of FIG. 4, the time sequence of the tensioning of the supporting strap 13, on the one hand, and of the filling of the air bag 3, on the other hand, will now be explained.

The ignition of the cartridge 31, on the one hand, acts upon the piston 24 for tightening the supporting strap 13 and, on the other hand, ignition gas or an ignition flame flows from the cartridge 31 through a hole 32 which is centrically arranged in a closing piston 33 which is situated between the energy accumulator 18 and the gas generator 29 within the propelling charge container 23. Also, in a manner aligned with the closing piston 33, holes 34 are provided in a closing bush 35 in the gas generator 29. The closing piston 33 and the closing bush 35 are arranged and dimensioned such that a passing-through of ignition gas or of an ignition flame from the cartridge 31 through the hole 32 in the closing piston 33 and further through the holes 34 in the closing bush 35 to the gas generator 29 can take place only as long as the closing piston 33 is not tightly disposed in the closing bush 35.

Since the energy accumulator 18, which is ignited by means of the cartridge 31, provides a high-pressure level, the latter always reliably pushes the closing piston 33 into the closing bush 35, in which case, suitable devices, such as a filigree ring 36, for example, made of plastic, can be inserted between the closing piston 33 and the gas generator 29 in order to require a predetermined force before the high pressure level can move the closing piston 33 toward the gas generator 29 and thus toward the closing bush 35. The ring 36 is broken by the high pressure level created during the ignition of the energy accumulator 18.

The low-pressure level generated by the ignition of the gas generator 29 on the side of the closing bush 35 facing away from the closing piston 33 cannot prevent the corresponding movement of the closing piston 33. As the result of the conical construction of the closing piston 33, this closing piston 33 will be jammed in its end position in the closing bush 35 so that the passage through the hole 32 and the holes 34 is reliably prevented. As a result, it can be excluded that pressure gas can flow from the high-pressure side into the air bag 3.

The controlling of the sequence of the tensioning of the supporting rope 13, on the one hand, and of the filling of the air bag, on the other hand, therefore takes place by the movement of the closing piston 33 which, for example, may be constructed as a one-piece shaped-out section of a membrane which, in FIG. 3, moves toward the right as the result of the pressure in the high-pressure chamber.

In FIG. 3, the pressure of the ignited low-pressure side pushes the, for example, thimble-shaped closing piston 33 toward the right so that the ignition gas passage holes 32 and 34 are closed. For securing the condition "ignition holes OPEN", for example, the filigree ring 36 made, for example, of plastic, is inserted and is broken by the pressure occurring during the ignition.

FIG. 3 shows an appropriately shaped membrane provided with flow-through holes which is constructed such that the ignition gas flows through the holes and that, at a higher pressure on the left side of the propelling charge container, the membrane, by means of its molded-on cone, automatically closes the central hole of the low-pressure side at a corresponding cone angle.

For example, conical embodiments can also be used for closing the pressure gas passage from the high-pressure to the low pressure side. In addition, it is possible to use, for example, an additional return plate in the event that the high pressure may be reduced faster than the low pressure and a flowing-out of the latter is to be prevented.

The operation according to the invention is, for example, as follows: During the bracing, for example, of a thorax bag 3, for example, approximately 300 bar are required, for example, from a pyrotechnical propelling charge container as an energy accumulator for effectively moving the piston 24. In contrast, for the inflating of the bag 3, for example, no more than 100 bar should be required so that no more than 1 bar occurs in the bag. Within the scope of the invention, this is achieved, for example, by a conventional, particularly electrically ignitable propelling charge container 18, whose ignition advantageously, for example, through corresponding holes 32, 34, ignites through from the high-pressure chamber to the low-pressure chamber. In the case of such an embodiment, such ignition holes 32, 34 must then be closed immediately.

Since the gas generator 29 is therefore ignited only after the action upon the piston 24 by the cartridge 31 activating or triggering the energy accumulator 18, it is automatically achieved that the tensioning of the supporting strap 13 will start before the inflating of the air bag 3 begins. As the result, the air bag 3 is brought into its protective position B (FIG. 2) by the supporting strap 13 before it is completely inflated.

Figure 4A:
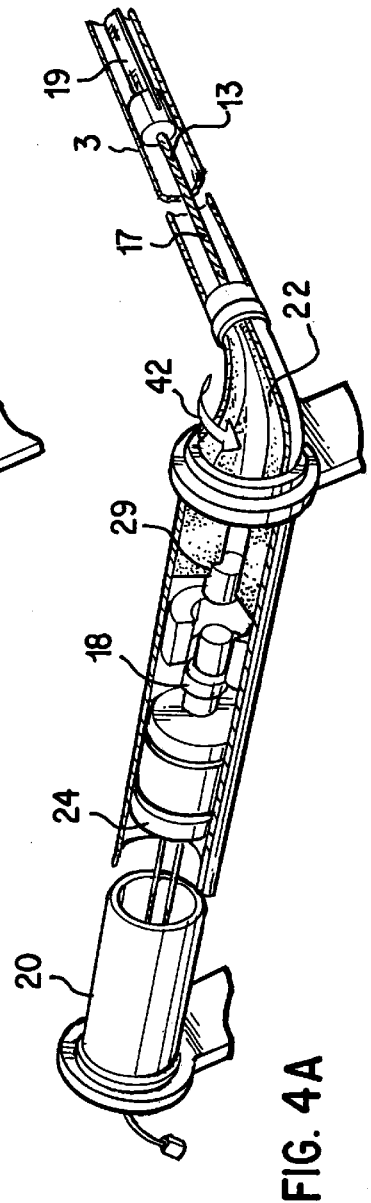
FIGS. 4A, 4B and 4C are schematic representations of individual consecutive conditions during the triggering of the side air bag system.
Figure 4B:
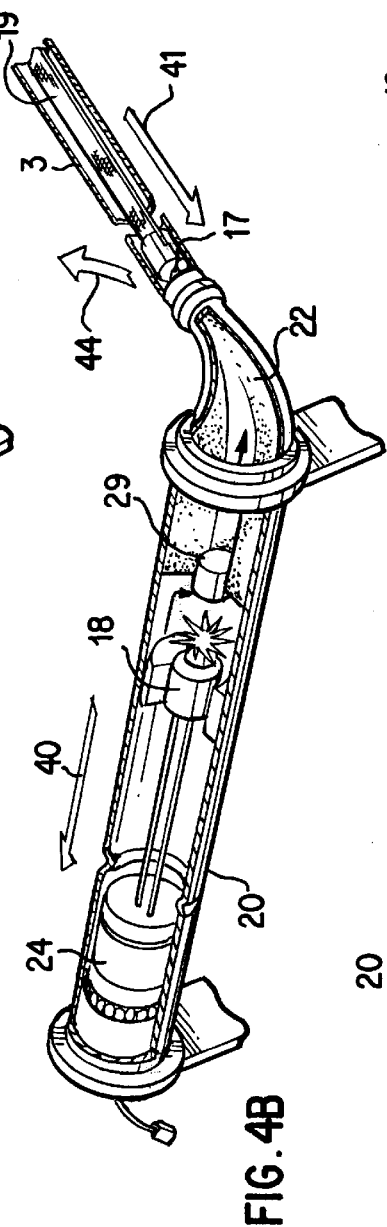

FIG. 4A illustrates the starting condition before a triggering of a side air bag system 2. By the triggering of the energy accumulator 18 (FIG. 3), the piston 24 is acted upon so that it moves according to the arrow 40 in FIG. 4B. As the result, the supporting strap 13 fastened to the piston 24 is pulled according to the arrow 41 in FIG. 4B. Since the deflection 22 is rotatable, as indicated by the arrow 42 in FIG. 4A, by pulling the supporting rope 13 taut, the air bag 3 at first situated in its folded position B (compare FIG. 1) in the seat 1 can be pulled out, so that its side 3C extends between the backrest element 7 and the seat element 6 of the seat 1. In this case, the deflection 22 swivels upwards, as indicated by the arrow 44 in FIG. 4B.

Figure 4C:
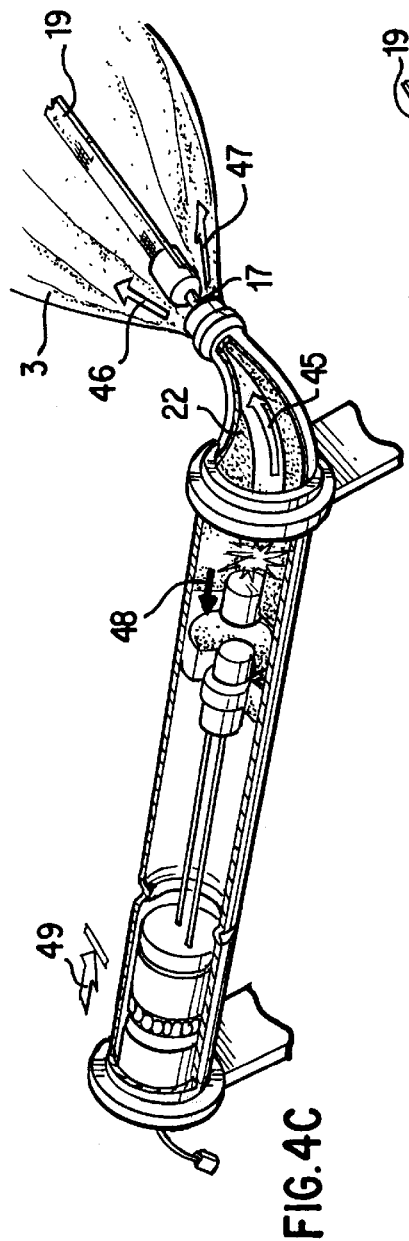

By the ignition of the energy accumulator 18, the gas generator 29 is also ignited, which will then generate gas for filling the air bag 3, which gas flows according to the arrows 45, 46 and 47 in FIG. 4C into the air bag 3. A flowing-out of this gas into the tube 20 toward the piston 24 is prevented by suitable valve devices, such as the closing piston 33 and the closing bush 35 with the holes 32 and 34. The closing of the valve devices is symbolized by the arrow 48 in FIG. 4C. In addition, it is shown in FIG. 4C by the blocked-off representation of the arrow 49 that a return motion of the piston 24 is blocked, which can be implemented, for example, by means of a ball clamping brake 26, which was explained above. Preferably, such a block is released again after a predetermined or predefinable time period.

The controlling of the triggering sequence of the tensioning of the supporting or tensioning rope 13 and the filling of the air bag 3 can therefore be implemented in the case of separate devices for the respective operation—that is, the energy accumulator 18 for the tensioning of the supporting rope 13 and the gas generator 29 for the filling of the air bag 3 are separate—, in a particularly skillful manner by means of suitable valve devices. In practice, this may be called a pyrotechnical two-pressure level propelling charge container which is used as the operating device 15.

The invention provides an improved side air bag system as well as a corresponding operating process therefor and a motor vehicle seat therefor. As illustrated particularly in the embodiments, a cushion-shaped air bag is preferred. The inflating of such an air bag normally requires at least 20 ms. During this time, the space between a vehicle body and an occupant has become very narrow in the event of an impact from the outside. An air bag which is not positioned in time can only still be used as an impact cushion for distributing the load. By means of the tensioning or supporting rope, the invention positions the air bag within half that time. Preferably, the air bag is already inflated in the process. Since, as the result of the tensioned strap, it is already in position, during the further inflating, it presses the occupant actively away from the accident. In addition, a rotation of the occupant takes place by the one-sided seat backrest stabilized on the outside, also away from the accident.

In particular, it should be pointed out that, in the case of a so-called pyrotechnical two-pressure-level propelling charge container as the operating device 15, many types of valves are conceivable and are contained within the scope of the invention, which first permit, for example, a pyrotechnical ignition from the high-pressure side to the low-pressure side or leave the corresponding chambers in the tube 20 closed. For example, after the ignition of the gas generator has taken place, by means of its pressure buildup or gas pressure, corresponding passages can be closed between the two sides by means of suitable valve-type devices so that then each side can optimally carry out its function and also carries it out if it is triggered.

Although the invention was discussed in the realm of the side air bag system 2 within the scope of the embodiments only by means of its application to a motor vehicle seat 1, such a side air bag system 2 can also be used in the case of other seats, for example, in boats, airplanes or rail vehicles, in which case, the holding effect of the air bag 3 with the tensioning or supporting strap 13 is particularly advantageous in the fields of navigation and aviation. Thus, a pressure drop in airplane which may be caused by a leakage may lead to the triggering of the side air bag system 2, whereby the air bag 3 with the tensioning or supporting strap 13 provides another holding device for a person in his seat, possibly in addition to the seat belt, and simultaneously serves as a cushion and a protection. As a cushion, which can be stored in a space-saving and weight-saving manner, the air bag 3 prevents with respect to the supporting strap 13, an injury caused by the latter. Also in the case of boats, such as racing boats, it may be advantageous that, in the event of an accident, the occupants are held in their seats as firmly as possible but can still be released fast and are simultaneously protected from the effects of a hard impact. The side air bag system 2 according to the invention is therefore not limited to the use in motor vehicles, and within the scope of the invention, the claimed motor vehicle seat, on the whole, should be understood as a seat if a person sitting in it can be protected by the side air bag system 2 according to the invention.

The above-mentioned characteristics and combinations of characteristics of all discussed embodiments which are illustrated in the drawings are used only as examples for explaining the invention and are not used for limiting it. The disclosure content of all present documents is determined by what the person skilled in the art can easily recognize in the claims but also in the description and in the drawing, including variations, modifications and substitutions as well as, in particular, the complete contents of the introductory part of the specification in connection with the discussion of the coupling of the supporting strap with the operating devices.

I claim:

1. A side air bag system, comprising:

a seat having a back rest element and a seat element;

at least one inflatable air bag arranged in the seat in an uninflated state;

a supporting strap coupled with the air bag, one end being secured to the backrest element;

operating devices for tensioning the supporting strap and inflating the air bag into a protective position, another end of the supporting strap being coupled to one of the operating devices;

wherein the supporting strap pulls the air bag out of a folded position in the seat and into a protective position when tensioned, said tensioning of the supporting strap restraining lateral movement of a seat occupant while allowing the air bag to inflate in the protective position.

2. The side air bag system according to claim 1, wherein the air bag is designed to have a cushion-shape which extends in the protective position between the backrest element and the seat element.

3. The side air bag system according to claim 1, wherein the air bag has a substantially triangular shape such that, in the protective position, a first side fits along the backrest element, a second side fits along the seat element and a third side extends between the backrest element and the seat element.

4. The side air bag system according to claim 2, wherein the cushion-shape is substantially triangular such that a first side fits along the backrest element, a second side fits along the seat element and a third side extends between the backrest element and the seat element.

5. The side air bag system according to claim 1, wherein the supporting strap is situated in one of an interior of the air bag and in a guide assigned to an outer cover of the air bag, and further wherein the supporting strap is one of connected at least in sections with the outer cover of the air bag and constructed integrally with the air bag.

6. The side air bag system according to claim 1, wherein the operating devices tension the supporting strap at least partially before inflation of the air bag begins.

7. The side air bag system according to claim 1, wherein the operating devices are designed to inflate the air bag during the tensioning of the supporting strap.

8. The side air bag system according to claim 7, wherein the operating devices inflate the air bag beginning simultaneously with the tensioning of the supporting strap.

9. The side air bag system according to claim 1, wherein the operating devices comprise a tensioning device for the supporting strap and a filling device for the air bag, the tensioning device and the filling device being coupled and interacting with one another.

10. The side air bag system according to claim 9, wherein the filling device comprises at least one of a gas generator and a gas storage device.

11. The side air bag system according to claim 9, wherein the tensioning device comprises at least one energy accumulator and driving devices which can be acted upon by the energy accumulator for tensioning the supporting strap, and further wherein the driving devices contain a releasable return stop which, with respect to triggering of the operating devices, automatically releases in a time-delayed manner.

12. The side air bag system according to claim 10, wherein the tensioning device comprises at least one energy accumulator and driving devices which can be acted upon by the energy accumulator for tensioning the supporting strap, and further wherein the driving devices contain a releasable return stop which, with respect to triggering of the operating devices, automatically releases in a time-delayed manner.

13. The side air bag system according to claim 10, wherein the gas generator and/or the gas storage device of the filling device is at least part of an energy accumulator of the tensioning device.

14. The side air bag system according to claim 11, wherein the energy accumulator of the tensioning device is at least a part of the gas generator and/or the gas storage device of the filling device.

15. The side air bag system according to claim 10, wherein the air bag is connected in a gas-tight manner with one of the gas generator and the gas storage device.

16. The side air bag system according to claim 11, wherein the air bag is connected in a gas-tight manner with one of the gas generator and the gas storage device, and further wherein the supporting strap is permanently coupled to the driving devices.

17. The side air bag system according to claim 11, wherein a permanent coupling of the supporting strap to the driving devices occurs automatically upon triggering.

18. The side air bag system according to claim 16, wherein the driving devices comprise a piston acted upon by the energy accumulator and to which the supporting strap is coupled.

19. The side air bag system according to claim 18, wherein the supporting strap is coupled to the piston automatically by the triggering of the driving devices.

20. The side air bag system according to claim 10, wherein one of the gas generators and the gas storage device of the filling device is pyrotechnically activatable.

21. The side air bag system according to claim 11, wherein the energy accumulator of the tensioning device is pytrotechnically activatable.

22. The side air bag system according to claim 10, wherein one of the gas generator and the gas storage device of the filling device has a multi-stage design.

23. The side air bag system according to claim 11, wherein the energy accumulator of the tensioning device has a multi-stage design.

24. The side air bag system according to claim 10, wherein one of the gas generator and the gas storage device of the filling device is electrically triggerable.

25. The side air bag system according to claim 24, wherein at least a first stage of the gas generator and/or the gas storage device of the filling device is electrically triggerable.

26. The side air bag system according to claim 11, wherein the energy accumulator of the tensioning device is electrically triggerable.

27. The side air bag system according to claim 16, wherein at least a first stage of the energy accumulator of the tensioning device is electrically triggerable.

28. The side air bag system according to claim 22, wherein at least a second stage of the gas generator and/or the gas storage device of the filling device is mechanically triggerable.

29. The side air bag system according to claim 23, wherein at least a second stage of the energy accumulator of the tensioning device is mechanically triggerable.

30. The side air bag system according to claim 24, wherein at least a second stage of the gas generator and/or the gas storage device of the filling device is mechanically triggerable.

31. The side air bag system according to claim 26, wherein at least a second stage of the energy accumulator of the tensioning device is mechanically triggerable.

32. The side air bag system according to claim 24, wherein at least mechanically, portions of the triggering system are provided twice and can be acted upon simultaneously but independently of one another.

33. The side air bag system according to claim 26, wherein at least mechanically, portions of the triggering system are provided twice and can be acted upon simultaneously but independently of one another.

34. The side air bag system according to claim 28, wherein at least mechanically, portions of the triggering system are provided twice and can be acted upon simultaneously but independently of one another.

35. The side air bag system according to claim 29, wherein at least mechanically, portions of the triggering system are provided twice and can be acted upon simultaneously but independently of one another.

36. The side air bag system according to claim 30, wherein at least mechanically, portions of the triggering system are provided twice and can be acted upon simultaneously but independently of one another.

37. The side air bag system according to claim 1, wherein on an end assigned to the operating devices, the supporting strap is formed by a material resistant to operating temperatures in the operating devices.

38. The side air bag system according to claim 1, wherein the supporting strap has, at least in an area of the air bag situated in the protective position, a width which is significantly larger than its thickness, and further wherein the width of the supporting strap is in a range of approximately 10% to approximately 90% of a diameter of the air bag.

39. The side air bag system according to claim 38, wherein the width of the supporting strap is in the range of approximately 20% to approximately 60% of a diameter of the air bag.

40. The side air bag system according to claim 38, wherein the width of the supporting strap is in the range of approximately 25% to approximately 40% of a diameter of the air bag.

41. The side air bag system according to claim 1, further comprising two air bags coupled with pertaining supporting straps for use on both sides of an occupant, wherein the two air bags are operated via a common one of the operating devices.

42. The side air bag system according to claim 1, wherein, before triggering, the air bag and the supporting strap are arranged in an angular accommodation space designed such that, in the protective position, they span an angle formed by the angular accommodation space.

43. A process for operating a side air bag system having at least one inflatable air bag, a supporting strap tensionable in an area of the inflatable air bag, and operating devices for inflating the air bag and tensioning the supporting strap into a final protective position, the process comprising the acts of:

triggering the side air bag system;

restraining lateral movement of a seat occupant by tensioning a supporting strap for the air bag upon triggering the side air bag system;

inflating the air bag; and supporting the inflating of the air bag such that it unfolds from a folded condition into an at least essentially unfolded condition by the tensioning of the supporting strap.

44. The process according to claim 43, further comprising the act of, after triggering the side air bag system, stretching the supporting strap before beginning to inflate the air bag.

45. The process according to claim 44, wherein the stretching of the supporting strap and the inflating of the air bag are started at least substantially simultaneously after triggering the side air bag system.

46. A motor vehicle seat, comprising:

a seat element and a backrest;

a side air bag system having at least one air bag inflatable via at least one operating device, said side air bag in its folded condition being arranged in an angular accommodation space extending on one side of the motor vehicle seat over the seat element and the backrest element, wherein in an inflated condition, the air bag extends in a protective position between the seat element and the backrest element, a supporting strap arranged along the air bag, said supporting strap being tensionable in an area of the inflated air bag and being coupled with the air bag such that the tensioning strap pushes the air bag into the protective position, wherein the supporting strap together with the folded air bag is arranged in the angular accommodation space, and further wherein the at least one operating device during the triggering of the air bag is designed to act upon the supporting strap in order to tension the supporting strap into the protective position, wherein the tensioning of the supporting strap restrains lateral movement of a seat occupant while pulling the air bag into the protective position.

47. The motor vehicle seat according to claim 46, further comprising at least one of a covering and tear seams provided in the accommodation space, wherein the air bag and the supporting strap, before triggering, are situated behind the covering or the tear seams.

48. The motor vehicle seat according to claim 46, wherein the operating devices are arranged below the seat element in a driving direction.

49. The motor vehicle seat according to claim 48, wherein the operating devices are arranged transversely to the driving direction and are reinforcingly connected with one of a seat structure and a vehicle structure.

50. The motor vehicle seat according to claim 46, further comprising at least two air bags, one air bag and its assigned supporting strap being provided on each side of the motor vehicle seat.

51. The motor vehicle seat according to claim 49, wherein the two air bags are acted upon jointly by a single operating device.

52. The motor vehicle seat according to claim 46, further comprising compensating devices for coupling at least one of the supporting strap and the air bag to the operating devices.

53. The motor vehicle seat according to claim 46, wherein at least one of the supporting strap and the air bag are coupled to the operating devices when the side air bag system is triggered.

54. The motor vehicle seat according to claim 46, wherein the air bag has a substantially triangular shape, such that in the protective position a first side fits along the backrest element, a second side fits along the seat element, and a third side extends between the backrest element and the seat element.

* * * * *